Sept. 22, 1959  B. M. GORDON  2,905,895
FREQUENCY METER CIRCUIT
Filed Nov. 2, 1956

AT STEADY STATE
$f = Cf_o$
$C = f/f_o$

INVENTOR.
BERNARD M. GORDON
BY
Trachtman & Zoda
ATTORNEYS.

United States Patent Office 2,905,895
Patented Sept. 22, 1959

2,905,895

FREQUENCY METER CIRCUIT

Bernard M. Gordon, Newton, Mass., assignor to Epsco, Incorporated, Boston, Mass., a corporation of Massachusetts Application November 2, 1956, Serial No. 620,088

23 Claims. (Cl. 324—79)

The invention relates to a counting device and more particularly to a frequency meter circuit of the closed loop servo-type provided with means for accelerating its operation.

This is a continuation in part of application for U.S. Letters Patent, application Serial No. 542,875, filed by me on October 26, 1955, and entitled "Frequency Meter."

The invention provides a counting apparatus and frequency meter of the servo-type delivering an output signal in binary form proportioned to the rate of sequentially received signals delivered to the apparatus and embodying means for accelerating its operation.

Heretofore, signal responsive counting and frequency measuring devices of the servo-type have been provided which have responded exponentially to changes in the frequency being measured. The normal exponential response of such devices to changes of input frequency to be measured have limited their frequency response and accuracy with which changes in frequency can be followed.

It is therefore a primary object of the invention to provide a new and improved signal counting or frequency meter circuit of the servo-type having means increasing its frequency response and the accuracy with which changes in frequency of the signal being measured are followed.

Another object of the invention is to provide a new and improved frequency meter circuit which is simple and inexpensive in operation and construction.

Another object of the invention is to provide a new and improved frequency meter circuit which continuously delivers an output signal reflecting the frequency of input signals.

Another object of the invention is to provide a new and improved frequency meter circuit which does not require special conversion apparatus for delivering its information signals in binary form.

Another object of the invention is to provide a new and improved frequency meter circuit which can follow and measure the frequency of the input signal with increased accuracy while its frequency is changing.

Another object of the invention is to provide a new and improved frequency meter circuit which may be adapted to arrive at and deliver an output information signal having the accuracy required with a minimum of delay.

Another object of the invention is to provide a new and improved frequency meter circuit which may readily measure high and low frequency signals.

Another object of the invention is to provide a new and improved frequency meter circuit which may be readily adapted for various design and system requirements.

The above objects as well as many other objects of the invention will be apparent from the description of the invention when read in conjunction with the drawings, in which.

Like reference numerals designate like parts throughout the several views.

Figure 1:
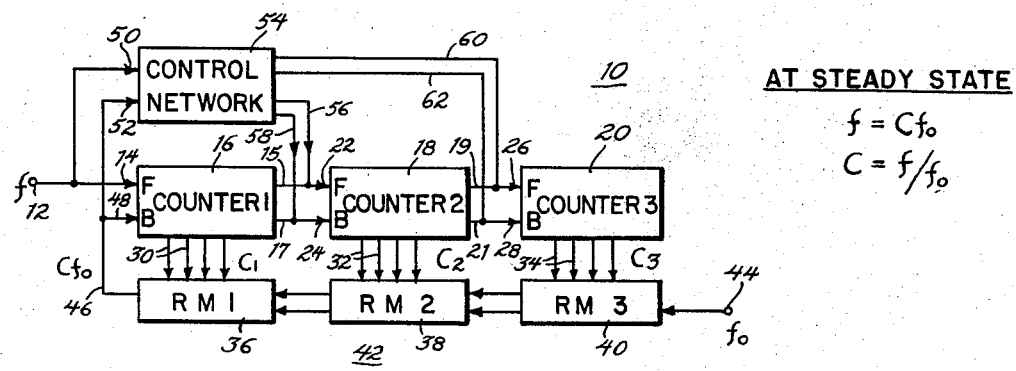
Figure 1 is a block diagram illustrating an embodiment of the invention.

Refer to Figure 1 which illustrates a frequency meter or counting circuit 10 having an input terminal 12 for receiving signals having a pulse repetition rate or frequency $f$ which is to be measured. The signals received by the terminal 12 are delivered to the forward count input lead 14 of a reversible counter 16 of the binary type. The counter 16 is arranged in cascade with second and third reversible counters 18 and 20. Neither the counter 20 nor any additional cascade counters which may be added after the counter 20 is required for the operation of the invention. The counter 20, however, is included for purposes of illustrating the versatility of the counting circuit 10.

Forward carry signals are delivered by the counter 16 over the output line 15 to the forward count input lead 22 of the counter 18, while backward carry signals from the counter 16 are delivered over its output line 17 to the backward count input lead 24 of the counter 18.

Similarly, the counter 18 delivers forward carry signals over its output line 19 to the forward count input lead 26 of the counter 20, and backward carry signals over its output line 21 to the backward count input lead 28 of the counter 20.

The sets of output leads 30, 32, 34 of the counters 16, 18 and 20 deliver, in binary form, the respective counts $C_1$, $C_2$, and $C_3$. The count signals delivered by the output lines 30, 32 and 34 actuate the rate control lines of the corresponding units 36, 38 and 40 of a binary rate multiplier 42.

The binary rate multiplier 42 may be of the type described by Bernard M. Gordon in an article entitled "Adapting Digital Techniques for Automatic Controls" published in the November 1954 issue of Electrical Manufacturing magazine.

The unit 40 of the rate multiplier 42 is activated by signals received on the input terminal 44 having a predetermined frequency $f_0$. The unit 36 delivers sequential output signals or pulses having a rate $(Cf_0)$ equal to the product of the total count C of the counters 16, 18 and 20 multiplied by the frequency $f_0$ of the signal received at the input terminal 44. These multiplier signals are sequentially delivered to the output line 46 of the binary rate multiplier 42 and are received by the backward count input lead 48 of the counter 16.

The signals from the input terminal 12 and the signals on the output line 46 of the binary rate multiplier 42 are respectively delivered to the input leads 50 and 52 of a control network 54. The control network 54 has output lines 56 and 58 for selectively delivering signals to the forward and backward count input leads 22 and 24 of the counter 18. The control network may also be provided with a pair of output lines 60 and 62 for selectively delivering output signals to the forward and backward input count leads 26 and 28 of the counter 20.

In operation, the frequency meter or counting circuit 10 is in an equilibrium or steady state condition when the rate of signals delivered to the input terminal 12 is equal to the rate of signals delivered to the output line 46 of the binary rate multiplier 42. Under these circumstances, the number of forward count signals delivered to the input lead 14 of the counter 16 is equal to the number of backward count signals delivered to the backward count lead 48 over a given period of time. Thus, the count $C_1$ of the counter 16 is substantially constant and no carry signals are delivered to the following counter 18. Likewise, the count $C_2$ of the counter 18 remains constant and the counter 18 does not deliver carry signals to the counter 20 so that its count $C_3$ also remains constant.

From the cascade arrangement, the counter 16 has a count $C_1$ which is of lowest numerical significance, while the counter 18 has a count $C_2$ of greater numerical significance, and the counter 20 has the count $C_3$ of highest numerical significance. The combined counts $C_1$, $C_2$, and $C_3$ of the counters 16, 18, and 20 is equal to the total count $C$ of the circuit 10.

Since under steady state conditions, the rate of signals on the input terminal 12 is equal to the rate of signals on the output line 46, the following relationship is established:

$$f = Cf_0$$

$$C = f/f_0$$

Under such steady state conditions, when the rates of the signals delivered to the input lines 50 and 52 of the control network 54 are substantially equal, the control network 54 does not deliver output signals over its lines 56, 58, 60, and 62.

However, under unbalanced or transient conditions where, for example, the rate of signals on the input terminal 12 exceeds by a predetermined amount the rate of product signals on the line 46, the control network 54 delivers output signals on its line 56 to the forward count lead 22 of the counter 18.

By this action, the rate of increase of the count $C$ of the circuit 10 is accelerated, thereby increasing the speed with which the circuit 10 approaches its steady state condition.

During conditions of sufficient high unbalance of the circuit 10, signals may also be delivered over the output line 60 of the control network 54 to the forward input lead 26 of the most numerically significant counter 20. This will increase the count of the apparatus 10 at a greater rate, thereby more speedily reducing the difference between the transient count and the count $C$ which will be assumed by the apparatus 10 in its steady state condition.

Where the circuit 10 is in a sufficiently unbalanced condition due to the rate of the signals at the input terminal 12 being less than the rate of signals delivered by the output line 46, the following action takes place. The control network 54 delivers output signals over its line 58 to the backward count input lead 24 of the counter 18, thereby accelerating the reduction of the count $C$ of the apparatus 10. If the unbalance is greater than a given amount, the control network 54 will deliver signals over its output line 62 to the backward count input lead 28 of the most significant counter 20, thereby reducing at a greater rate the count $C$ of the circuit 10. As the unbalance decreases, the control network 54 will terminate the delivery of signals over the output line 62 to prevent an over-shooting of the steady state count of the circuit 10. Signals, may, however, continue to be delivered over the output line 58 to the counter 18 of intermediate significance until the unbalance is sufficiently reduced. The control network 54 will discontinue delivering signals to the counter 18 as the steady state condition is approached to prevent over-shooting the desired steady state count.

It is noted that the stabilizing action of the circuit 10, without the action of the control network 54, would cause the count $C$ to approach its steady state value at an exponential rate. The exponential rate decreases as the final balance condition is approached. The stabilizing action is accelerated by the delivery of additional count signals by the control network 54. The control network 54 effectively bypasses the counters of lower numerical significance when the unbalance is sufficiently great, thereby accelerating the action of the apparatus in reaching its steady state condition.

It is also noted that when the circuit 10 is provided with many counting stages for high static accuracy, the dynamic response of the circuit 10 closely approaches the higher speed of response afforded by a counter having a smaller number of counters of higher numerical significance. This results from selectively delivering input signals to the stage which corresponds with the amount of unbalance of the circuit 10.

Thus, when the circuit 10 is in its steady state condition or sufficiently close to it, the control network 54 will not deliver output signals. However, when the apparatus is in the unbalance condition, and the unbalance state is sufficiently great to require correction of the count $C_2$ of the counter 18, the counter 16 will be bypassed by the delivery of signals from the control network 54 directly to the input of the counter 18. Likewise, when the error is sufficiently great to require appreciable correction of the count $C_3$ of the counter 20, the control network 54 will deliver signals directly to the input of the counter 20. When the count of the counter 20 is sufficiently accurate, although not precisely accurate, delivery of signals directly to this counter 20 may be terminated, while signals to the counter 18 directly from the control network 54 will be delivered until the required degree of accuracy of the count $C_2$ of the counter 18 is attained. Further delivery of signals solely to the input of the counter 16 then serves to place the circuit 10 in its steady state condition and gives the maximum degree of accuracy attainable under static conditions.

It is noted that the circuit 10, when the frequency of the signal on the terminal 12 is varying, allows the count $C$ to more quickly follow the changes occurring, although perhaps not with the accuracy obtained during static conditions, where the frequency of the signal $f$ on the input terminal 12 remains constant. It is noted, however, that the circuit 10 maximumizes the accuracy obtainable, since if the circuit 10 did not provide means for quickly changing its count under such signal variations, the count $C$ would be even less accurate in its dynamic response. Under conditions of rapid fluctuation in the frequency of the input signal at terminal 12 causing sufficient unbalance so that the control network 54 bypasses the least significant counter 16, the accuracy of the count $C$ of the circuit 10 is nevertheless maximumized since the count $C_1$ of the least significant counter 16 at this time has no significance. Of course, the accuracy in terms of number of significant digits increases with the decrease in the rate of fluctuation of the signal $f$ on the input terminal 12, providing the maximum accuracy under static conditions.

It is noted that a great advantage of the circuit 10 is its ability to speedily follow large rapidly occurring changes of fluctuations in the frequency $f$ of the input signal being measured, while yet providing the high accuracy of a multistage cascade counter for decreased rates of fluctuation in the frequency $f$ of the input signal 12.

Figure 2:
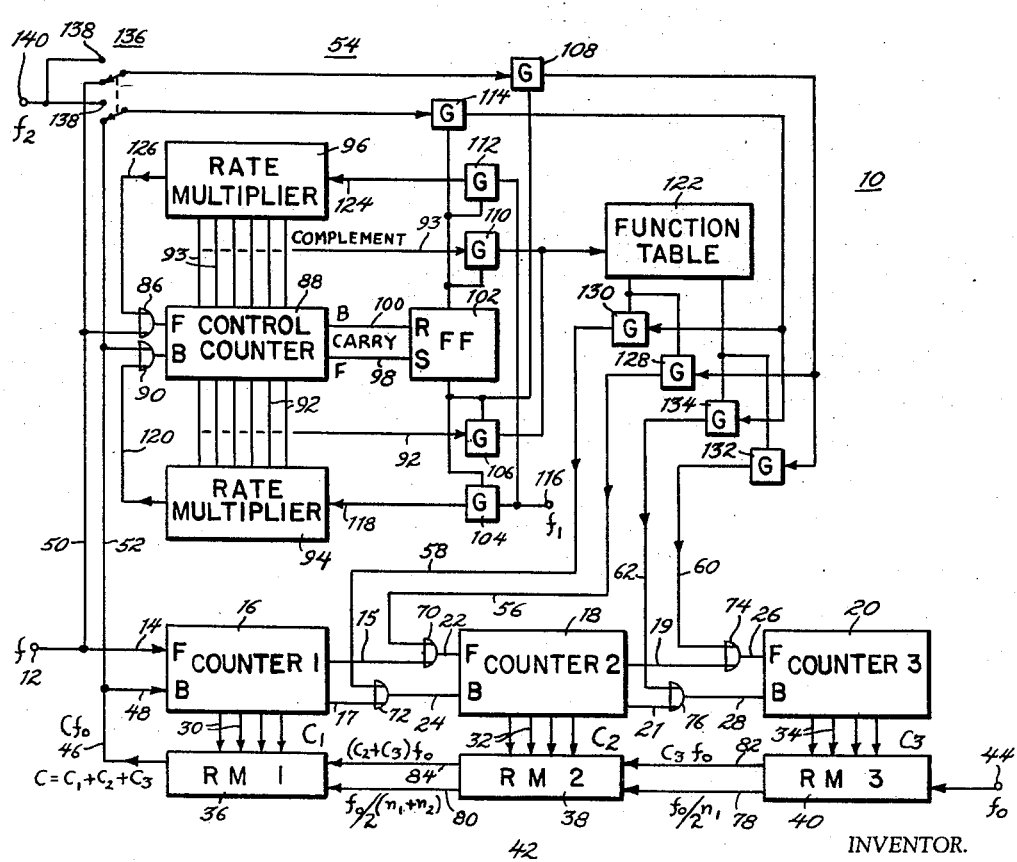
Figure 2 is a block diagram illustrating in greater detail the circuit shown in Figure 1.

Refer now to Figure 2 which discloses in greater detail the circuit 10 of Figure 1.

The cascade counters 16, 18, and 20 are arranged identically as shown in Figure 1, except that buffers 70 and 72 are respectively provided at the input leads 22 and 24 of the counter 18, and buffers 74 and 76 are respectively provided at the input leads 26 and 28 of the counter 20.

The binary rate multiplier 42 is also identical to that described in Figure 1. The unit 40 of the binary rate multiplier 42 which receives the actuating pulses of frequency $f_0$ from terminal 44 delivers on its output line 78 pulses having a frequency $f_0$ divided by 2 to a power of a factor $n_1$ which corresponds to the number of binary stages in the unit 40. The signals on the line 78 actuate the unit 38 of the binary rate multiplier 42 which in turn delivers to its output line 80 signals having a frequency $f_0$ divided by 2 to the power of the sum of the stages $n_1$ and $n_2$ respectively of the units 40 and 38. The signals on the output line 80 actuate the unit 36 of the binary rate multiplier 42.

The unit 40 of the binary rate multiplier 42 delivers on its output line 82 signals having a product rate $C_3f_0$. The signals on the output line 82 are buffed with the signals produced by the unit 38 of the binary rate multiplier 42 delivering on the output line 84 of the unit 38 a combined product signal having the rate $(C_2+C_3)f_0$. The signal on the line 84 is buffed with the product signal from the unit 36 of the binary rate multiplier 42 delivering to the output line 46 of the rate multiplier 42, the total product signal having a rate equal to the sum of the counts $C_1$, $C_2$ and $C_3$ multiplied by the frequency $f_0$ of the activating signal on the terminal 44. Since the sum of the count signals $C_1$, $C_2$ and $C_3$ is equal to the total count C of the circuit 10, the rate of the output signal on line 46 may be represented by $Cf_0$.

As previously described, when the input signal on terminal 14 has a rate exceeding that of the signal on the line 46, the count C of the circuit 10 increases, thereby increasing the product signal $Cf_0$ on line 46. When the rates of signals on the input terminal 12 and the output line 46 of the rate multiplier 42 are equal, the count C of the circuit 10 corresponds to the frequency or rate of the input signal on terminal 12 and the circuit 10 is in its steady state condition.

The control network 54 which accelerates the action of the counting circuit 10 in assuming its steady state condition will now be described in detail.

The control network 54 of the circuit 10 samples the signals received by the input terminal 12 and the signals delivered by the line 46 for determining its action for accelerating the operation of the circuit 10 to assume its steady state condition. The input signals to terminal 12 are delivered over a line 50 through an input buffer 86 to the forward count lead of a reversible control counter 88 of the binary type. Signals from the output line 46 of the rate multiplier 42 are delivered over a line 52 and through an input buffer 90 to the backward count lead of the control counter 88. The count of the control counter 88 is delivered in binary form over a plurality of output leads 92 to the rate control lines of a forward rate multiplier 94. The complement of the count signals on the lines 92 is delivered by the control counter 88 over the output lines 93 to a backward rate multiplier 96. Since the signals delivered over the output lines 93 of the control counter 88 are the complement of the signals delivered over the output lines 92, the count represented by the signals on the lines 93 will decrease as the count represented by the signals on the lines 92 increases, and will increase as the count represented by the signals on the line 92 decreases.

When the control counter 88 is counting in the forward direction, a forward count signal will be delivered to its output line 98 when the count passes through the zero value in the forward direction. Similarly, when the control counter 88 is counting in the reverse or backward direction, a backward count output signal will be delivered over the line 100 when the control counter passes through the zero count in the backward direction.

A forward carry signal on line 98 is delivered to a control flip-flop 102 placing it in its set condition, while a backward carry signal on line 100 is delivered to the flip-flop 102 placing it in its reset condition. The control flip-flop 102 in its set state conditions the forward gates 104, 106 and 108 for passing signals, while the flip-flop 102 in its reset state conditions the backward gates 110, 112 and 114 for passing signals.

The forward gate 104 when conditioned by the flip-flop 102 passes signals from the input terminal 116 having a repetition rate or frequency $f_1$. The signals from the gate 104 are delivered to the activating input line 118 of a forward rate multiplier 94.

When the rate multiplier 94 is thus activated by signals on its input line 118, it delivers a product signal having a rate which is the multiple of the count represented by the signals on the lines 92 of the control counter 88 and the frequency $f_1$ of the signals at the input terminal 116. The product signal from the rate multiplier is delivered over its output line 120 through the buffer 90 to the backward count input lead of the control counter 88. Since the control flip-flop 102 is in its set condition, the count signals on the lines 92 are also delivered through the plurality of gates 106 to a function table network 122.

When the control flip-flop 102 is in its reset condition, the activating signals on terminal 116 are passed through the backward gate 112 to the input line 124 of the backward rate multiplier 96. The backward rate multiplier 96 delivers output signals on its line 126 which have a rate determined by the product of the frequency $f_1$ of the activating signals and the count on the output lines 93 of the control counter 88. The signals on the line 126 of the rate multiplier 96 are delivered through the buffer 86 to the forward count input lead of the reversible counter 88.

It is noted, however, that as the count of the control counter 88 decreases in value, the complement count on the lines 93 increases and the rate of signals on the output line 126 of the rate multiplier 96 likewise increases.

With the flip-flop 102 in its reset condition, the complement count on the output lines 93 of the control counter 88 are passed through the plurality of gates 110 to the input of the function table 122.

The function table 122 is controlled by the count signal which it receives and selectively delivers gating signals to a first set of forward and backward output gates 128 and 130, and a second set of forward and backward count output gates 132 and 134.

The first set of gates 128 and 130 receives gating signals from the function table 122 when the input count signal has reached a predetermined minimum value, while the second set of output gates 132 and 134 receive a gating signal from the function table 122 after the count received has attained a higher predetermined value.

A selector switch 136 when positioned as shown in Figure 2, delivers the signals on lines 50 and 52 respectively to the forward and backward control gates 108 and 114. When the switch 136 is placed in its alternate position contacting the terminals 138, signals delivered to the input terminal 140 having a predetermined repetition rate or frequency $f_2$ are delivered to the inputs of gates 108 and 114.

When the forward control gate 108 is conditioned by the flip-flop 102 in its set condition, it passes signals to the forward output gates 128 and 132. When the control flip-flop 102 is in its reset state, the backward control gate 114 is conditioned to pass signals to the backward output gates 130 and 134.

Signals passed by the forward output gate 128 are delivered through the buffer 70 to the forward count input lead 22 of the counter 18, while signals passed by the backward output gate 130 are delivered through the buffer 72 to the backward count input lead 24. The signals passed by the forward output lead 132 are delivered through the buffer 74 to the forward count input lead 26 of the counter 20, while signals passed by the backward output gate 134 are delivered through the buffer 76 to the backward count input lead 28.

In the operation of the circuit 10, input signals are delivered to the input terminal 12 having a frequency $f$ which is to be measured. Signals having predetermined frequencies $f_0$, $f_1$ and $f_2$, are respectively delivered to the input terminals 44, 116 and 140.

When the circuit 10 is in its steady state condition, the rate of pulses delivered to the forward count input lead 14 of the counter 16 is equal to the rate of pulse signals delivered to its backward count input lead 48. Under these circumstances, the count C of the circuit 10 is proportional to the frequency $f$ of the signal at the input terminal 12.

As explained in connection with Figure 1, if the rate or frequency $f$ of the signals delivered to the input 12 increases, an unbalance condition results causing the count C of the counter to increase until the steady state condition is re-established. Similarly, if the frequency $f$ of the signal delivered to the input terminal 12 decreases, the count C of the circuit 10 correspondingly decreases until the equilibrium condition is again established.

The servoing action of the circuit 10 described above is caused by the difference in the rates of signals delivered to the forward and backward input leads 14 and 48 of the counter 16 providing an exponential correction curve. The control network 54 which conditionally operates to accelerate this exponential action of the circuit 10 tending to place it in its steady state condition shall now be described in detail. With the circuit 10 in its equilibrium state, the signals delivered over the lines 50 and 52 to the forward and backward leads of the control counter 88, have equal rates. Therefore these input signals do not change the count of the control counter which remains at zero count.

If the frequency $f$ of the input signal terminal 12 exceeds the rate of signals on the line 46, the circuit 10 reacts as follows:

The signals delivered to the forward and backward input leads 14 and 48 of the counter 16 cause it to count in the forward direction increasing its count $C_1$. The counter 16 may deliver forward carry signals to the counter 18. The counter 18 is caused to count forward by the carry signals to increase its count $C_2$ and may also deliver carry output signals to the forward input line of the counter 20 causing it to raise its count $C_3$ when necessary. This action increases the rate of signals on the line 46 tending to place the circuit 10 in its equilibrium or steady state condition.

The signals on terminal 12 and line 46 are also respectively delivered by the lines 50 and 52 of the forward and backward inputs of the reversible control counter 88. Therefore, the rate of signals to the forward input lead of the control counter 88 also exceeds the rate of signals to its backward input lead. Because of this inequality, the control counter will be caused to count in the forward direction, increasing its count.

If the control flip-flop 102 is in its reset condition, the control counter 88 will continue counting in the forward direction until it passes through its zero count at which time a forward carry signal is delivered to the line 98 placing the flip-flop 102 in its set condition. The control counter 88 will continue counting forward through its zero count.

The count of the control counter 88 is delivered over its output lines 92 to the rate control lines of the forward multiplier 94. The activating signals on terminal 116 are passed through the forward gate 104 activating the rate multiplier 94 and causing the delivery of a product signal to the output line 120. These signals are buffed with the signals which are delivered by the line 52, thereby augmenting the rate at which signals are received by the backward input of the control counter 88. The count of the control counter 88 will increase until the rate of signals delivered to its forward input is equal to the rate of signals delivered to its backward input, at which time an equilibrium condition is established. It is noted that the count of the control counter 88 is related to the degree of unbalance of the rates of the signals on the lines 50, 52, and will be zero when the rates are equal.

The function table 122, which receives the count on the lines 92 of the control counter 88 through the gates 106, delivers gating signals to the gates 128 and 130 when the count received has attained a predetermined minimum value.

Under such circumstances, the forward gate 128 delivers the signals passed by the forward control gate 108 over the line 56 to the forward input lead 22 of the counter 18. These signals may be the signals on line 50 or the signals on input terminal 140 depending upon the position of the selector switch 136.

The signals delivered to the forward input lead 22 of the counter 18 causes it to count in the forward direction rapidly increasing the count C of the circuit 10 and causing it to more speedily approach its steady state condition. The increase in the count C of the circuit 10 increases the rate of signals on line 52 so that it approaches the rate of signals on the line 50. As the rates of signals on lines 50 and 52 tend towards equilibrium, the count of the control counter 88 is correspondingly reduced. When the count of the control counter 88 is sufficiently reduced, the function table 122 removes the gating signals from gates 128 and 130, terminating the further delivery of forward counting signals to the counter 18. This prevents overshooting of the equilibrium state, as the circuit 10 approaches its steady state condition.

Where the unbalance of the rates of signals of lines 50, 52 is sufficiently great so that the control counter 88 attains a correspondingly high count, the function table 122 delivers gating signals to the output gates 132, 134. In this situation, the signals delivered by the forward control gate 108 are passed through the forward output gate 132 and over the line 60 to the forward count input lead 26 of the counter 20. This causes the counter 20 to increase its count, tending to accelerate the action of the apparatus 10 in assuming its steady state condition. It is noted, however, that since the counter 20 is a counter having the most significant positions, the count C of the circuit 10 is increased at a high rate corresponding to the high condition of unbalance. When the condition of unbalance is sufficiently reduced, the function table 122 terminates the delivery of signals to the counter 20, but allows the delivery of signals to the counter 18 which is in a position of lower numerical significance. As the circuit 10 continues towards its equilibrium condition, the function table 122 terminates delivery of forward count input signals to the counter 18.

The final equilibrium condition of the circuit 10 is then established by the action of the signals delivered to the forward and backward count leads of the counter 16. The counter 16 may deliver forward and backward carry pulses to the counter 18, while the counter 18 may also deliver forward or backward carry pulses to the counter 20 for establishing the equilibrium condition.

If the frequency $f$ of the input signal at the terminal 12 now decreases so that it is exceeded by the rate of signals on the line 46, the circuit 10 reacts as follows.

The signals delivered to the forward and backward input leads 14 and 48 of the counter 16 cause it to count in the backward direction reducing its count $C_1$. The counter 16 may deliver backward carry signals to the counter 18. The counter 18 is caused to count backwards by the carry signals to decrease its count $C_2$ and may also deliver carry output signals to the backward input line of the counter 20 causing it to reduce its count $C_3$ when necessary. This action reduces the rate of signals on the line 46 tending to place the circuit 10 in its equilibrium or steady state condition.

The signals on terminal 12 and line 46 are also respectively delivered by the lines 50 and 52 to the forward and backward inputs of the reversible control counter 88. Since the rate of signals on line 52 exceeds that on line 50, the control counter 88 is caused to count in a backward direction. When the control counter 88 counts in the backward direction through its zero count, it delivers a backward carry signal to line 100. The backward carry signal on line 100 places the control flip-flop 102 in its reset state.

Upon counting backwards through the zero count, the control counter 88 assumes its highest count and reduces this count in its backward counting action. Since the complement of the count of the control counter 88 is delivered to its output lines 93, the highest count of the control counter 88 corresponds to a zero count on the line 93. The reduction of the count of the counter 88 by its backward counting action results in a corresponding increase in the count of its complement on the lines 93.

The backward rate multiplier 96 which has its rate controlled by the complement count on the lines 93 is now actuated by signals from the input terminal 116 and delivers product signals over its output line 126 to the forward input lead of the control counter 88. In this manner, the complement count on the output lines 93 of the control counter 88 is caused to assume a value which corresponds to the degree of unbalance of the rates of the signals on the lines 50 and 52 as explained in connection with the forward rate multiplier 94. Since the control flip-flop 102 is in its reset condition, the function table network 122 receives the complement count from the lines 93 through the gates 110.

The function table network 122 operates as previously described, so that signals from the backward control gate 114, which is now permitted to pass signals, are delivered through the backward output gate 130 when the count from the control counter 88 has reached a minimum predetermined value. When the count of the control counter 88 has reached a predetermined higher value, the backward output gate 134 is conditioned to pass signals.

The signals from the gate 10 are delivered over the line 58 to the backward count input lead 24 of the counter 18 for reducing its count, while the output signals from gate 134 are delivered over the line 62 to the backward count input lead of the counter 20. In this manner, the function table network 122 controls the delivery of backward count signals to the counter 18 or to the counter 22 depending upon the degree of unbalance of the circuit 10.

In the above description, it will be noted that the control network samples the signals received on the input terminal 12 and the signals delivered on line 46 of the rate multiplier 42 for determining the balanced or unbalanced state of the circuit 10. When the control network 54 determines an unbalanced condition, it delivers appropriate signals to increase or decrease the count of the circuit 10 at an accelerated rate, thereby speeding upon the operation of the circuit 10 in assuming its steady state condition. The control network 54 also determines the degree of unbalance and appropriately delivers signals to the stage of the counter having the numerical significant position corresponding to the unbalance and allowing the most efficient and rapid attainment of the balanced or steady state condition.

It will, of course, be understood that the description and drawings, herein contained, are illustrative merely, and that various modifications and changes may be made in the disclosed structure without departing from the spirit of the invention.

What is claimed is:

1. A counting apparatus having first and second cascade connected counting devices storing a count, an input terminal for receiving information signals which are coupled to said first counting device, and a feedback loop responsive to said count and coupling feedback signals to said first counting device tending to place said apparatus in a steady state condition; and a control network coupling signals to said second counting device in response to said information and feedback signals for accelerating the action of said apparatus tending to place it in its steady state condition.

2. A counting apparatus storing a count and having an input terminal for receiving information signals, a first reversible counting device having a forward input lead receiving signals coupled from said input terminal and a backward input lead receiving feedback signals developed in response to said count and tending to place the counting apparatus in a steady state condition, and a second reversible counting device having an input receiving forward and backward carry signals coupled from said first counting device; and a control network coupling signals to the input of said second counting device in response to said information and feedback signals for accelerating the action of said apparatus tending to place it in its steady state condition.

3. A counting apparatus storing a count and comprising an information input terminal; a first reversible counting device having a forward input lead receiving signals coupled from said input terminal, a backward input lead, and an output; a second reversible counting device having an input receiving forward and backward carry signals coupled from said first counting device, and an output; a rate multiplier unit controlled by the signals coupled from the outputs of said first and second counting devices indicative of said count and having an input line for receiving activating signals, and an output line coupling signals to the backward input lead of said first counting device; and a control network coupled to said input terminal and said rate multiplier output line and coupling signals to the input of said second counting device for accelerating the action of said apparatus tending to place it in its steady state condition.

4. A counting apparatus having first and second cascade connected counting devices storing a count, an input terminal for receiving information signals which are coupled to said first counting device, and a feedback loop responsive to said count and coupling feedback signals to said first counting device tending to place said apparatus in a steady state condition; and a control network energized by said information and feedback signals and selectively coupling said signals to said second counting device for accelerating the action of said apparatus tending to place it in its steady state condition.

5. A counting apparatus storing a count and having an input terminal for receiving information signals, a first reversible counting device having a forward input lead receiving signals coupled from said input terminal and a backward input lead receiving input signals developed in response to said count and tending to place the counting apparatus in a steady state condition, and a second reversible counting device having an input receiving forward and backward carry signals coupled from said first counting device; and a control network energized by said information and feedback signals and selectively coupling said signals to the input of said second counting device for accelerating the action of said apparatus tending to place it in its steady state condition.

6. A counting apparatus storing a count and comprising an information input terminal; a first reversible counting device having a forward input lead receiving signals coupled from said input terminal, a backward input lead, and an output; a second reversible counting device having an input receiving forward and backward carry signals coupled from said first counting device, and an output; a rate multiplier unit controlled by the signals coupled from the outputs of said first and second counting devices and having an input line for receiving activating signals, and an output line coupling signals to the backward input lead of said first counting device; and a control network receiving signals coupled from said input terminal and output line of said multiplier unit and selectively coupling said signals to the input of said second counting device for accelerating the action of said apparatus tending to place it in its steady state condition.

7. A frequency meter apparatus comprising an information input terminal for receiving pulse signals at a frequency $(f)$; a first forward-backward binary counting device having a forward count input lead excited by signals coupled from said input terminal, a backward count input lead, a carry output, and a plurality of count output leads; a second forward-backward binary counting device having an input excited by signals coupled from the carry output of said first counting device, and a plurality of count output leads; a binary rate multiplier unit energized by the count signal (C) from the count output leads of said first and second counting devices for controlling its rate and having an input line for receiving pulse signals having a frequency ($f_0$), and an output line coupling the product signals ($Cf_0$) to the backward count input lead of said first counting device so that at steady state condition of said apparatus its count (C) corresponds to the ratio ($f/f_0$) of the respective frequencies ($f$ and $f_0$) of the signals received by said input terminal and input line of said multiplier unit; and a control network receiving signals coupled from said input terminal and output line of said multiplier unit and selectively coupling said signals to the input of said second counting device for accelerating the action of said apparatus tending to place it in its steady state condition.

8. A counting apparatus having first and second cascade connected counting devices storing a count, an input terminal for receiving information signals which are coupled to said first counting device, and a feedback loop coupling feedback signals developed in response to said count to said first counting device tending to place said apparatus in a steady state condition; and a control network determining an unbalanced condition of said apparatus in response to said information and feedback signals and coupling signals to said second counting device for accelerating the action of said apparatus tending to place it in its steady state condition.

9. The counting apparatus of claim 8 in which said control network responds to a difference in rates of said information and feedback signals for determining an unbalanced condition of said apparatus.

10. A counting apparatus storing a count having an input terminal for receiving information signals, a first reversible counting device having a forward input lead receiving signals coupled from said input terminal and a backward input lead receiving feedback signals developed in response to said count tending to place the counting apparatus in a steady state condition, and a second reversible counting device having an input receiving forward and backward carry signals coupled from said first counting device; and a control network determining an unbalanced condition of said apparatus and changing the count in response to said information and feedback signals and coupling additional signals to said second counting device for accelerating the action of said apparatus tending to place it in its steady state condition.

11. The counting apparatus of claim 10 in which said control network responds to a difference in rates of said information and feedback signals for determining an unbalanced condition of said apparatus.

12. A counting apparatus comprising an information input terminal; a first reversible counting device having a forward input lead receiving signals coupled from said input terminal, a backward input lead receiving feedback signals developed in response to the count of said apparatus and tending to place said apparatus in a steady state condition, and a carry output; a second reversible counting device having an input receiving forward and backward carry signals coupled from the carry output of said first counting apparatus; and a control network responsive to said information and feedback signals for determining an unbalanced condition of said apparatus; said control network accelerating the action of said apparatus tending to place it in its steady state condition by coupling additional forward and backward carry signals to said second counting device when the signals received by the forward input lead from said input signal are respectively greater and less than the feedback signals received by the backward input lead.

13. The counting apparatus of claim 12 in which said control network accelerates the action of said apparatus tending to place it in its steady state condition by coupling signals to the input of said second counting device causing it to count in the forward direction for accelerating the increase of its count when the information signals received by the forward input lead of said first counting device exceed the feedback signals received by its backward input lead and coupling signals to the input of said second counting device causing it to count in the backward direction for accelerating the decrease of its count when the feedback signals received by the backward input line of said first counting device exceed the information signals received by its forward input lead from said input terminal.

14. A counting apparatus comprising an information input terminal; a first reversible counting device having a forward input lead excited by signals coupled from said input terminal, a backward input lead, a carry output, and a count output; a second reversible counting device having an input receiving forward and backward carry signals coupled from the carry output of said first counting device, and a count output; a rate multiplier unit controlled by signals coupled from the count outputs of said counting devices and having an input line for receiving activating signals, and an output line coupling signals to the backward input lead of said first counting device; and a control network responsive to signals coupled from said input terminal and said rate multiplier output line for accelerating the action of said apparatus tending to place it in its steady state condition by coupling signals to the input of said second counting device causing it to count in the forward direction for accelerating the increase of its count when the information signals received by the forward input lead of said first counting device exceed the feedback signals received by its backward input lead and delivering signals to the input of said second counting device causing it to count in the backward direction for accelerating the decrease of its count when the feedback signals received by the backward input line of said first counting device exceed the information signals received by its forward input lead from said input terminal.

15. A frequency meter apparatus comprising an input terminal for receiving pulse information signals at a frequency ($f$); a first forward-backward binary counting device having a forward count input lead excited by signals coupled from said input terminal, a backward count input lead, a carry output, and a plurality of count output leads; a second forward-backward binary counting device having an input receiving forward and backward count signals coupled from the carry output of said first counting device, and a plurality of count output leads; a binary rate multiplier energized by the count signal (C) coupled from the count output leads of said first and second counting devices for controlling its rate and having an input line for receiving pulse signals having a frequency ($f_0$), and an output line coupling pulse signals of the product rate ($Cf_0$) to the backward count input lead of said first counting device, so that at steady state condition of said apparatus its count (C) corresponds to the ratio ($f/f_0$) of the respective frequencies ($f$ and $f_0$) of the signals received by said input terminal and the input line of said multiplier unit; and a control network responsive to said product rate and said information pulse signals for determining an unbalanced condition of said apparatus and accelerating the action of said apparatus tending to place it in its steady state condition by coupling pulse signals to the input of said second counting device causing it to count in the forward direction for accelerating the increase of its count when the frequency of the pulse information signals received by the forward count input lead of said first counting device exceeds the frequency of the pulse signals received by its backward count input lead from said multiplier unit and coupling pulse signals to the input lead of said second counting device causing it to count in the backward direction for accelerating the decrease of its count when the frequency of the pulse signals received by the backward count input lead of said first counting device from said multiplier unit exceeds the frequency of the information pulse signals received by its forward count input lead from said input terminal.

16. The frequency meter apparatus of claim 15 in which said control network responds to a difference in rates of the information signals received by said input terminal and the product signals delivered by said multiplier unit for determining an unbalanced condition of said apparatus.

17. A counting apparatus having first and second cascade connected counting devices, an input terminal for receiving forward count signals which are coupled to said first counting device, and a feedback loop coupling backward count signals to said first counting device in response to the count of said apparatus and tending to place said apparatus in a steady state condition; and a control network selectively coupling additional signals to said second counting device when actuated by the occurrence of more than one forward count signal for each backward count signal to directly increase the count of said second counting device and actuated by the occurrence of more than one backward count signal for each forward count signal to directly decrease the count of said second counting device accelerating the action of said counting apparatus tending to place it in its steady state condition.

18. The counting apparatus of claim 17 in which said control network increases the count of said second counting device by coupling to it forward count signals from the input terminal and decreases the count of said second counting device by coupling to it backward count signals from said feedback loop.

19. A counting apparatus having first and second cascade connected counting devices, an input terminal for receiving forward count signals which are coupled to said first counting device, and a feedback loop coupling backward count signals to said first counting device in response to the count of said counting devices and tending to place said counting devices in a steady state condition; a reversible control counter having an input energized by said first forward and backward count signals, and a count output; a rate multiplier unit controlled by signals coupled from the count output of said control counter and having an input line for receiving activating signals, and an output line coupling signals to the input of said control counter for producing a count responsive to the unbalanced condition of said counting devices; and means controlled by the count of said control counter for changing the count of said counting devices to accelerate the action of said counting device tending to place it in its steady state condition.

20. A counting apparatus having first and second cascade connected counting devices, an input terminal for receiving forward count signals which are coupled to said first counting device, and a feedback loop coupling backward count signals to said first counting device in response to the count of said counting devices and tending to place said counting devices in a steady state condition; a reversible control counter having forward and backward input leads respectively energized by said forward and backward count signals, a count output, and a carry output; a forward control rate multiplier energized by the count signals coupled from said control counter and having an input line conditionally receiving activating signals and an output line coupling signals to the backward input lead of said control counter; a backward control rate multiplier energized by the complement of the count signals from said control counter and having an input line conditionally receiving activating signals and an output line for delivering signals to the forward input lead of said control counter; switching means controlled by the delivery of forward and backward carry signals coupled from said control counter to selectively couple activating signals to the input line of the corresponding one of said forward and backward control multipliers; and a function table control means energized by the count signals from said control counter when said forward rate multiplier is activated for coupling signals to said second counting device to increase its count, and energized by the complement of the count signals from said control counter when said backward rate multiplier is activated for coupling signals to said second counting device to decrease its count to accelerate the action of said counting devices tending to place them in their steady state condition.

21. A frequency meter apparatus comprising an information input terminal for receiving input pulse signals at a frequency $(f)$; a first forward-backward binary counting device having a forward count input lead excited by signals coupled from said input terminal, a backward count input lead, a carry output, and a plurality of count output leads; a second forward-backward binary counting device having an input receiving forward and backward count signals coupled from the carry output of said first counting device, and a plurality of count output leads; a feedback binary rate multiplier unit energized by the count signal $(C_1)$ coupled from the count output leads of said first and second counting devices for controlling its rate and having an input line for receiving pulse signals having a frequency $(f_0)$, and an output line coupling backward count pulse signals at the product rate $(C_1 f_0)$ to the backward count input lead of said first counting device, so that at steady state condition of said counting devices their count $(C_1)$ corresponds to the ratio $(f/f_0)$ of the respective frequencies ($f$ and $f_0$) of the signals received by said input terminal and the input line of said feedback multiplier unit; a forward-backward binary control counter having a forward count input lead excited by signals coupled from said input terminal, a backward count input lead excited by the backward pulse signals coupled from said feedback multiplier unit, a carry output, and a plurality of count output leads delivering a count signal $(C_2)$; a forward control rate multiplier energized by the count signals coupled from said control counter and having an input line conditionally receiving activating pulse signals of frequency $(f_2)$ and an output line coupling pulse signals at a product rate $(C_2 f_2)$ to the backward input lead of said control counter; a backward control rate multiplier energized by the complement $(C_3)$ of the count signals from said control counter and having an input line conditionally receiving activating pulse signals of frequency $(f_2)$ and an output line coupling pulse signals at a product rate $(C_3 f_2)$ to the forward input lead of said control counter; switching means controlled by the delivery of forward and backward carry signals coupled from said control counter to selectively couple activating pulse signals $(f_3)$ to the input line of the corresponding one of said forward and backward control multipliers; and a function table control means energized by the count signals from said control counter when said forward rate multiplier is activated to couple pulse signals to said second counting device to increase its count, and energized by the complement of the count signals from said control counter when said backward rate multiplier is activated to couple pulse signals to said second counting device to decrease its count to accelerate the action of said counting devices tending to place them in their steady state condition.

22. The frequency meter apparatus of claim 21 including a third forward-backward binary counting device having an input receiving forward and backward count carry signals coupled from said second counting device, and a plurality of output leads bearing signals characteristics of the count $(C_1)$ of said counting devices; said function table control means being energized by the count signals from said control counter for conditionally coupling pulse signals to the input of said third counting device to change its count for accelerating the action of said counting devices tending to place them in their steady state condition.

23. Apparatus for providing an output indication of the ratio between first and second input signal rates comprising, a plurality of cascaded reversible counters, a corresponding plurality of cascaded rate multipliers each coupled to a respective one of said counters and responsive to the count therein for altering the rate of an input signal to the respective rate multiplier, means for coupling said second input signal to the last of said rate multipliers to derive a feedback signal from the output of the first thereof, means for coupling said first input signal and said feedback signal to the first of said counters to change the count therein in respective opposite directions, and control means coupled to said first counter and responsive to the difference in rates of said first and said feedback signals for providing additional signals to at least one following counter for altering the count therein in a direction tending to reduce the rate at which the count in said first counter is altered.

References Cited in the file of this patent

UNITED STATES PATENTS

| | | |
|---|---|---|
| 2,537,427 | Seid | Jan. 9, 1951 |
| 2,568,724 | Earp | Sept. 25, 1951 |